US007412640B2

(12) United States Patent
Kapur et al.

(10) Patent No.: US 7,412,640 B2
(45) Date of Patent: Aug. 12, 2008

(54) SELF-SYNCHRONIZING PSEUDORANDOM BIT SEQUENCE CHECKER

(75) Inventors: Mohit Kapur, Mount Kisco, NY (US); Seongwon Kim, Old Tappan, NJ (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/650,222

(22) Filed: Aug. 28, 2003

(65) Prior Publication Data

US 2005/0050419 A1 Mar. 3, 2005

(51) Int. Cl.
G06F 11/00 (2006.01)
G01R 31/28 (2006.01)

(52) U.S. Cl. ............... 714/742; 714/744; 714/739

(58) Field of Classification Search ........... 714/738, 714/707, 742, 744, 739
See application file for complete search history.

(56) References Cited

U.S. PATENT DOCUMENTS

| 3,648,237 | A |   | 3/1972  | Frey, Jr. et al. |         |
|-----------|---|---|---------|------------------|---------|
| 3,694,757 | A |   | 9/1972  | Hanna, Jr.       |         |
| 4,139,147 | A | * | 2/1979  | Franke           | 714/736 |
| 4,627,057 | A | * | 12/1986 | Schmidt et al.   | 714/736 |
| 4,639,548 | A |   | 1/1987  | Oshima et al.    |         |
| 4,771,463 | A |   | 9/1988  | Beeman           |         |
| 5,163,069 | A | * | 11/1992 | Hayashi          | 375/357 |
| 5,282,211 | A | * | 1/1994  | Manlick et al.   | 714/707 |
| 5,283,831 | A |   | 2/1994  | Cook et al.      |         |
| 5,321,754 | A |   | 6/1994  | Fisher et al.    |         |
| 5,334,962 | A | * | 8/1994  | Higgins et al.   | 333/247 |
| 5,390,199 | A | * | 2/1995  | Ajima et al.     | 714/819 |
| 5,392,289 | A |   | 2/1995  | Varian           |         |
| 6,215,876 | B1| * | 4/2001  | Gilley           | 380/260 |

(Continued)

FOREIGN PATENT DOCUMENTS

GB 1 281 390 7/1972

(Continued)

OTHER PUBLICATIONS

"Built-in testable error detection and correction" by Katoozi et al. Solid-State Circuits, IEEE Journal of Publication Date: Jan. 1992, vol. 27, Issue: 1 on pp. 59-66 ISSN: 0018-9200 INSPEC Accession No. 4123101.*

(Continued)

Primary Examiner—Cynthia Britt
(74) Attorney, Agent, or Firm—Anne V. Dougherty; Ryan, Mason & Lewis, LLP

(57) ABSTRACT

Self-synchronizing techniques for checking the accuracy of a pseudorandom bit sequence (PRBS) are provided. The PRBS being checked may be generated by a device (e.g., a device under test) in response to a PRBS received by the device (e.g., from a PRBS generator). In an aspect of the invention, a PRBS checking technique includes the following steps/operations. For a given clock cycle, the presence of an error bit in the PRBS generated by the device is detected. The error bit represents a mismatch between the PRBS input to the device and the PRBS output from the device. Then, propagation of the error bit is prohibited for subsequent clock cycles. The prohibition step/operation may serve to avoid multiple errors being counted for a single error occurrence and/or masking errors in the PRBS output by the device.

5 Claims, 6 Drawing Sheets

U.S. PATENT DOCUMENTS

| | | | |
|---|---|---|---|
| 6,396,889 B1 * | 5/2002 | Sunter et al. | 375/376 |
| 6,684,350 B1 * | 1/2004 | Theodoras et al. | 714/712 |
| 7,168,027 B2 * | 1/2007 | Lee et al. | 714/775 |
| 2002/0063553 A1 * | 5/2002 | Jungerman | 324/76.24 |
| 2002/0065621 A1 * | 5/2002 | Jungerman | 702/75 |
| 2004/0019844 A1 * | 1/2004 | Goodnow et al. | 714/798 |
| 2005/0027922 A1 * | 2/2005 | Kim | 711/1 |
| 2005/0058080 A1 * | 3/2005 | Fiddes et al. | 370/242 |
| 2005/0071399 A1 * | 3/2005 | Bonaccio et al. | 708/250 |

FOREIGN PATENT DOCUMENTS

KR         2003018996 A * 3/2003

OTHER PUBLICATIONS

Oliver Kromat et al., "A 10-Gb/s Silicon Bipolar IC for PRBS Testing," IEEE Journal of Solid-State Circuits, vol. 33, No. 1, pp. 76-85, Jan. 1998.

* cited by examiner

US 7,412,640 B2

SELF-SYNCHRONIZING PSEUDORANDOM BIT SEQUENCE CHECKER

FIELD OF THE INVENTION

The present invention generally relates to communication circuits and channels and, more particularly, to pseudorandom bit sequence checkers.

BACKGROUND OF THE INVENTION

The ongoing development of communication circuits and channels for the synchronous transport module (STM), the 10 Gigabit Ethernet (IEEE 802.3ae) and several other applications require the use of pseudorandom bit sequence (PRBS) generators and PRBS checkers to test communication circuits and/or channels.

There are two major types of conventional PRBS checkers. The first type of PRBS checker requires a synchronizing circuit. Various implementations of this type of checker are disclosed in U.S. Pat. Nos. 3,648,237, 5,283,831, 4,771,463, 5,321,754, 3,694,757, 4,639,548 and 5,392,289, the disclosures of which are incorporated by reference herein.

The second type of PRBS checker uses a self-synchronizing technique. This technique is disclosed in U.K. Patent No. 1,281,390 to R. Westcott entitled "Testing Digital Data Transmission Systems," 1972; and in "A 10-Gb/s Silicon Bipolar IC for PRBS Testing," IEEE Journal of Solid State Circuits, vol. 33, no. 1, January 1998, the disclosures of which are incorporated by reference herein.

SUMMARY OF THE INVENTION

The present invention provides self-synchronizing techniques for checking the accuracy of a pseudorandom bit sequence (PRBS). The PRBS being checked may be generated by a device (e.g., a device under test) in response to a PRBS received by the device (e.g., from a PRBS generator).

In an aspect of the invention, a PRBS checking technique includes the following steps/operations. For a given clock cycle, the presence of an error bit in the PRBS generated by the device is detected. The error bit represents a mismatch between the PRBS input to the device and the PRBS output from the device. Then, propagation of the error bit is prohibited for subsequent clock cycles. The prohibition step/operation may serve to avoid multiple errors being counted for a single error occurrence and/or masking errors in the PRBS output by the device.

The prohibition step/operation may further include correcting the error bit. Also, the PRBS checking technique may further include the step/operation of detecting the non-presence of a PRBS from the device. Further, the device may be a communication circuit or a communication channel.

The present invention also provides processor-based and article of manufacture-based aspects of the above-described PRBS checking techniques In another aspect of the invention, apparatus for checking the accuracy of an output PRBS generated by a device in response to an input PRBS received by the device includes the following components. The apparatus includes a shift register chain. The length of the shift register is dependent on a PRBS generation polynomial. The apparatus further includes a logic gate (e.g., an exclusive OR gate) coupled to the shift register chain and the device for detecting, for a given clock cycle, the presence of an error bit in the output PRBS, the error bit representing a mismatch between the input PRBS and the output PRBS. The apparatus still further includes at least one logic detector (e.g., a "one" detector) coupled to the logic gate for generating, in response to detection of the presence of the error bit, a logic value that causes the inversion of the error bit after waiting for a clock cycle so as to prohibit further propagation of the error bit through the shift register chain.

The apparatus may further include a second logic detector (e.g., a "zero" detector) coupled to the at least one logic detector for allowing enough clock cycles for the input PRBS to pass through the device and initialize the full length of the shift register chain. The second logic detector may generate an enable signal after completing its operation so as to turn on the at least one logic detector.

Further, the apparatus may include an error counter coupled to the logic gate for counting errors detected between the input PRBS and the output PRBS. The apparatus may further include an error count display coupled to the error counter for displaying the error count.

Still further, the apparatus may further include a third logic detector (e.g., a "no input sequence" detector) coupled to the shift register chain for detecting the non-presence of a PRBS from the device.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
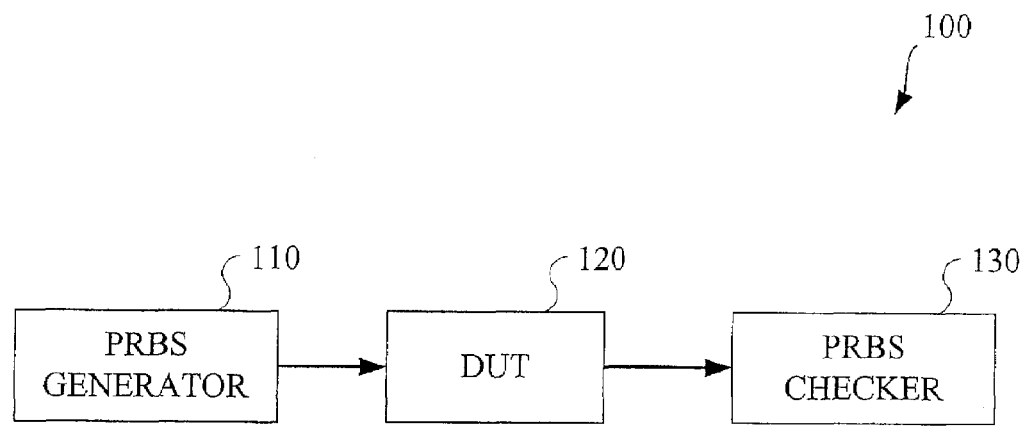
FIG. 1 is a block diagram illustrating a PRBS-based test system used to test communication circuits and channels.

Referring initially to FIG. 1, a block diagram illustrates a PRBS-based test system used to test devices such as communication circuits and channels. As shown, test system 100 includes three major blocks: a PRBS generator 110, a device under test (DUT) 120 and a PRBS checker 130. PRBS generator 110 feeds DUT 120 a random bit sequence of a desired length. DUT 120 can be, by way of example only, a communication channel under test/characterization or a communication circuit like a high speed serializer-deserializer. Of course, the DUT can be any device that can be tested in a binary system. The output of DUT 120 is also a PRBS stream. The output stream is then fed to PRBS checker 130. PRBS checker 130 checks the bits for correctness. The present invention focuses on PRBS checkers.

Figure 2:
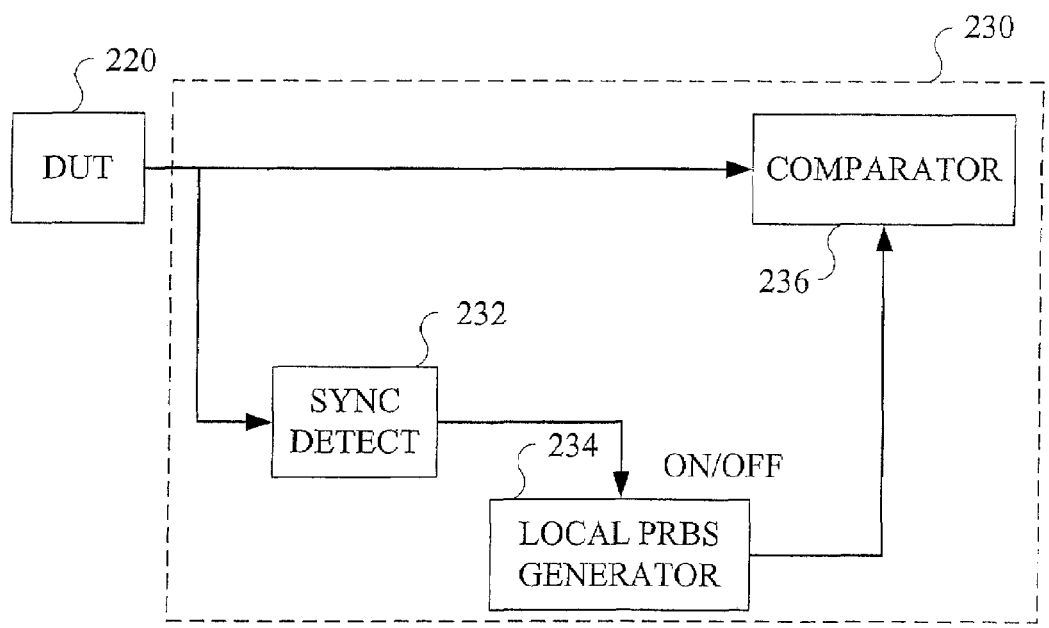
FIG. 2 is a block diagram illustrating a first type of PRBS checker.

As mentioned above, there are two major types of checkers. The first type uses a very simple technique as shown in FIG. 2. PRBS checker 230 includes a synchronization detector (synchronizing circuit) 232, a local PRBS generator 234 and a comparator circuit 236. Synchronization detector 232 looks for a known pattern in the incoming stream. Once detector 232 detects the known pattern, detector 232 turns on local PRBS generator 234. Local generator 234 and the generator (e.g., 110 in FIG. 1, but not expressly shown in FIG. 2) at the input of DUT 220 are designed to be identical.

After synchronization is achieved, the two generators are expected to produce identical bit streams. The comparator circuit 236 detects any mismatches caused due to DUT 220.

A major drawback of this technique is the penalty caused due to the synchronizing circuit. These circuits are difficult to build, consume a lot of power as they run at the full rate of incoming data, and their size grows with the length of the generation polynomial.

Figure 3:
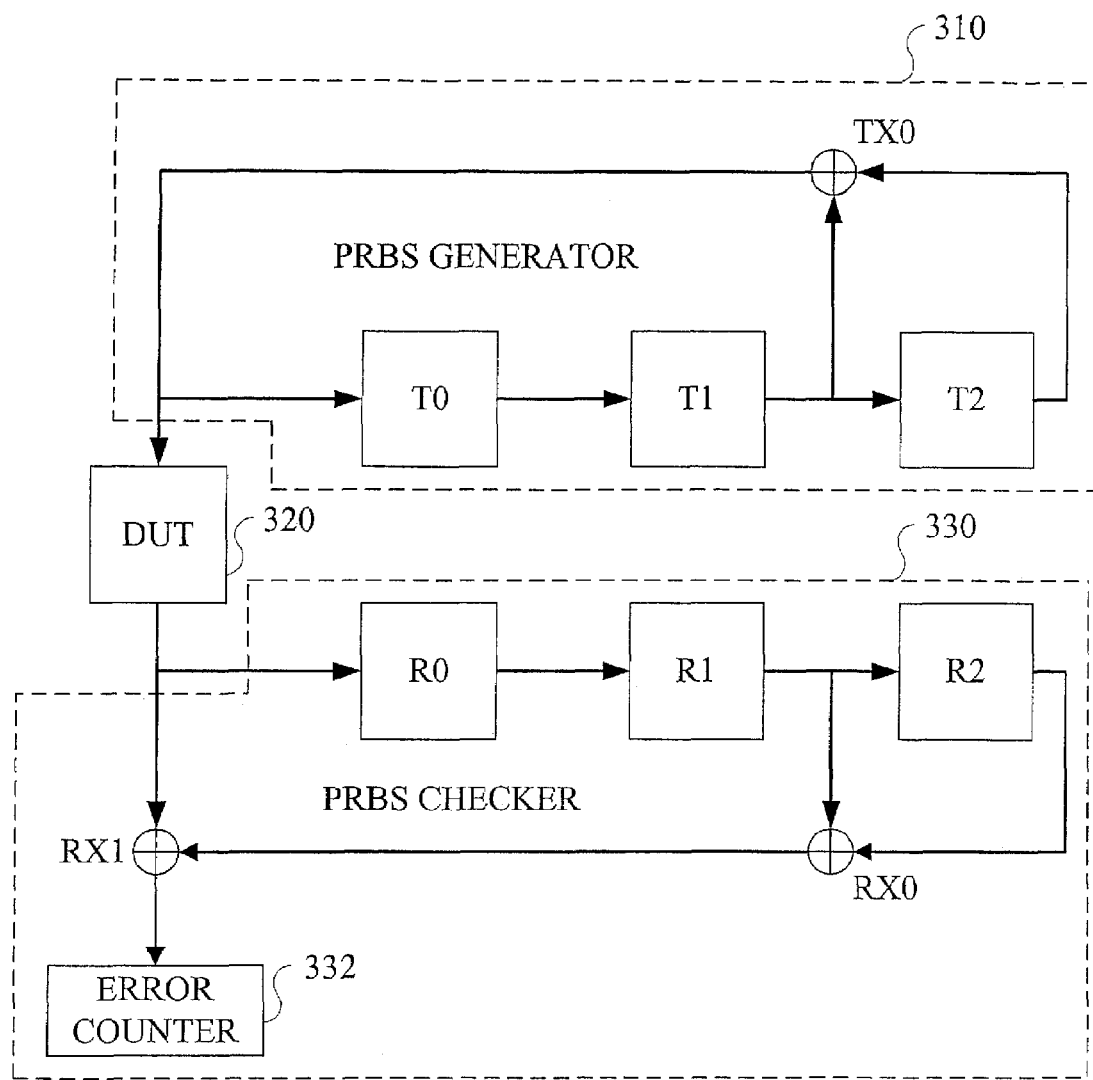
FIG. 3 is a block diagram illustrating a second type of PRBS checker.

A second approach uses a self-synchronizing technique as shown in FIG. 3. This approach eliminates the need for a synchronizing circuit. As shown, PRBS generator 310 includes shift registers T0, T1 and T2, which form a shift register chain. The output of T2 and T1 is fed to an XOR (exclusive OR) gate TX0. The output of TX0 is fed to the input of register T0. Thus, a PRBS of length seven is formed. At any given time, there are three bits in the generator registers (T0 through T2). These three bits identify a single state out of seven states that the generator cycles through. Any new state can be derived from a previous state by the XOR and shift operation. This fundamental principle of generation is used in the self-synchronizing checker.

PRBS checker 330 includes a shift register chain including R0, R1 and R2. Checker 330 also includes XOR gate RX0, XOR gate RX1 and error counter 332. The incoming bits from DUT 320 are shifted directly into the shift register chain which is of the same length as the generator shift register. The outputs of registers R2 and R1 in the receive side are then fed to XOR gate RX0. The output of RX0 is compared with the incoming bit. The comparison is done using XOR gate RX1. Under ideal circumstances, the incoming bit is the same as the RX0 output. Any errors introduced by DUT 320 are then counted by error counter 332.

This technique has three major drawbacks. First, multiple errors are flagged for a single occurrence. For example, if the DUT sends a bit stream with a single error bit, an error will be flagged at the output of XOR gate RX1 for the first time. This error bit will then propagate from the input of register R0 to the output of R1 after two clock events. When the erroneous bit arrives at the output of R1, the erroneous bit will flag an error for the second time. An error flag will be raised for the third time when this bit reaches the output of R2. Thus, a single error will be flagged three times.

A second drawback is that the technique of FIG. 3 masks errors. For example, if in any given incoming stream there are two error bits separated by one, two or three bit positions, these will cancel each other, thus showing no error at all. This is referred to as masking. A third drawback of the technique of FIG. 3 is that if the DUT sends out only zero bits, no error is flagged.

A fundamental reason for flagging of multiple errors and masking is the propagation of an erroneous bit through the shift registers. The present invention realizes that to prevent such an occurrence, the error bit propagation has to be stopped. For example, in a binary system, this error bit can be inverted to its correct value.

Figure 4:
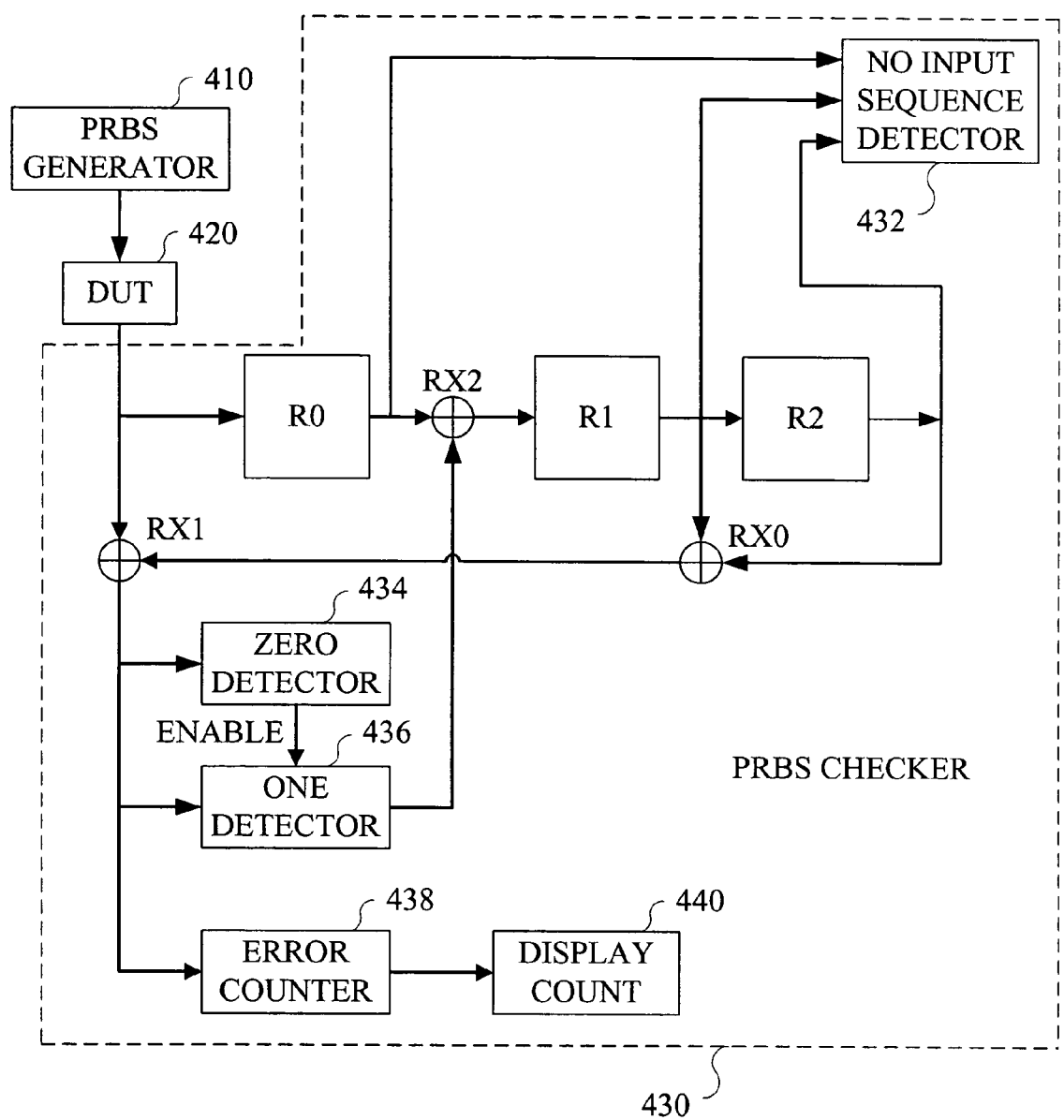
FIG. 4 is a block diagram illustrating a PRBS checker according to an embodiment of the present invention.

Referring now to FIG. 4, a block diagram illustrates a PRBS checker according to an embodiment of the present invention. As shown in FIG. 4, PRBS generator 410 is coupled to the input of DUT 420. PRBS checker 430 is coupled to the output of DUT 420. PRBS generator 410 may be the same as PRBS generator 310 of FIG. 3. However, a PRBS generator is not limited to that particular arrangement. Also, DUT 420 may be a communication circuit or channel under test. However, a DUT is not limited to such devices.

PRBS checker 430 includes a shift register chain including R0, R1 and R2. Checker 430 also includes XOR gate RX0, XOR gate RX1, XOR gate RX2, no input sequence detector 432, zero detector 434, one detector 436, error counter 438 and display count 440.

Thus, as illustratively depicted in FIG. 4, the technique uses the same length shift register chain as in FIG. 3 (R0 through R2). Thus, the incoming bits from DUT 420 are shifted directly into the shift register chain which is of the same length as the generator shift register. The outputs of registers R2 and R1 in the receive side are then fed to XOR gate RX0. The output of RX0 is compared with the incoming bit. The comparison is done using XOR gate RX1.

An error in the DUT output stream is immediately flagged as a "1" at the output of RX1. This "1" is delayed by one clock cycle in one detector 436 and is used to invert the output of register R0 using XOR gate RX2. Zero detector 434 is employed to allow enough clock cycles for the generator data to flush (pass) through the DUT and initialize the full shift register length (R0 through R2). Zero detector 434 generates an enable signal after completing its operation to turn on one detector 436.

Error counter 438 counts the errors and display count 440 displays the error count. The error counter may be a conventional binary synchronous counter.

If the number of subsequent zero bits in the output stream of DUT 420 is equal to the length of the shift register chain (R0 through R1), no input sequence detector 432 flags an error. This is done because a PRBS generator cannot generate a sequence of zero bits with a length equal to or greater than the length of shift register chain. The operation of PRBS checker 430 is further explained by the flow chart of FIG. 5. Although the checker is implemented for a generator with polynomial $X^3+X^2+1$ for simplicity, the inventive techniques can be extended to any PRBS polynomial.

Figure 5:
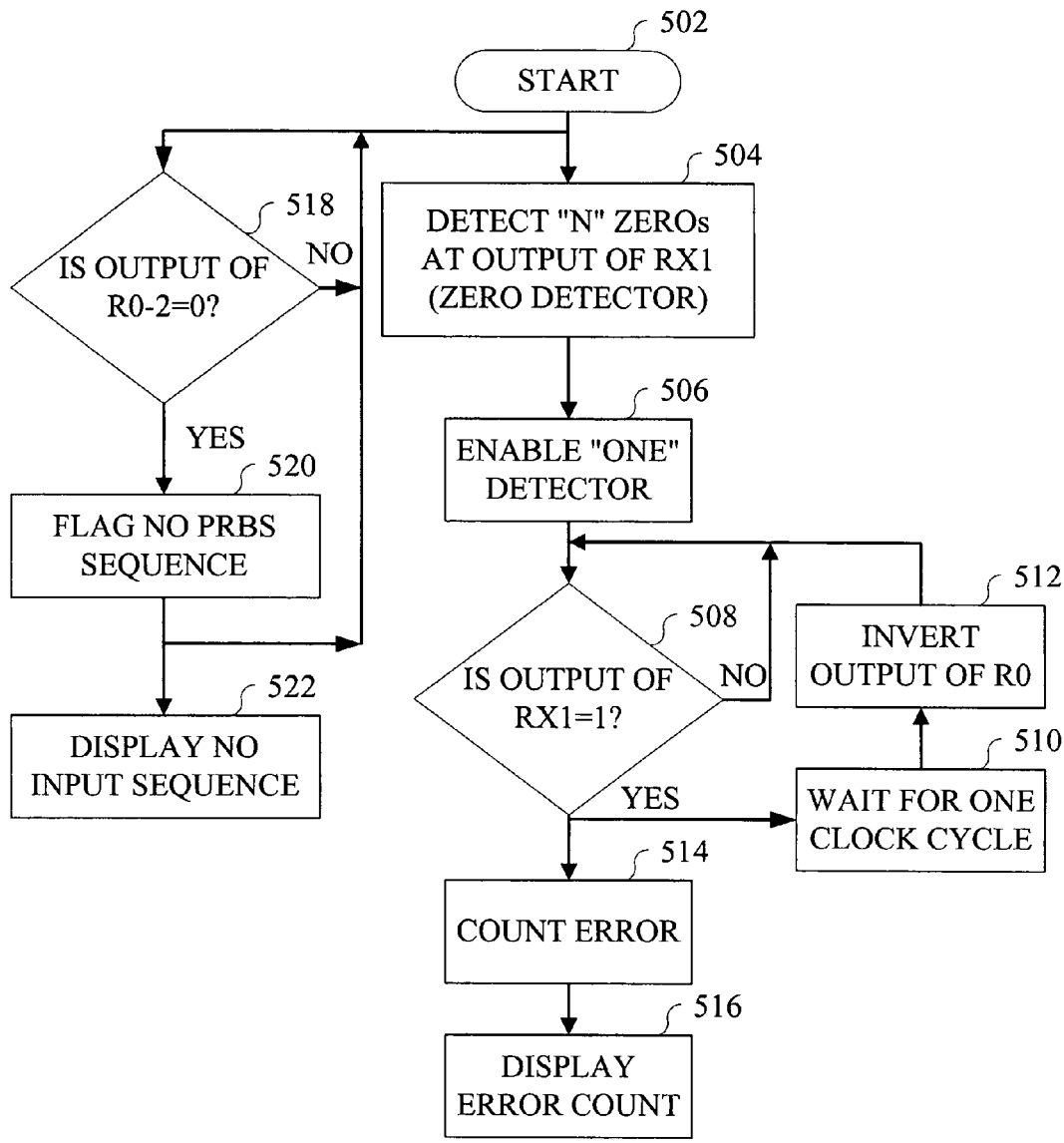
FIG. 5 is a flow diagram illustrating the operation of a PRBS checker according to an embodiment of the present invention.

Referring now to FIG. 5, a flow diagram illustrates the operation of PRBS checker 430. Operation starts at block 502. In step 504, the checker detects "N" zeros at the output of XOR gate RX1. This is done by zero detector 434. It is to be understood that "N" is decided by the designer and equals the number of clock cycles required to flush the DUT plus the number of clock cycles required to flush the checker shift register chain.

In step 506, once "N" zeros are detected, one detector 436 is enabled. In step 508, it is determined whether the output of RX1 equals one. If the output of RX1 equals one, the checker waits one clock cycle (step 510) and then inverts the output of register R0 (step 512). Also, if the output of RX1 equals one, the checker counts the error (step 514) and displays the error count (step 516). The error may be counted by error counter 438 and the error count displayed by count display 440. If the output of RX1 does not equal one (step 508), the step loops until a one is detected.

Further, in step 518, it is determined whether the output of the shift register chain (R0 through R2) is equal to zero. If the output of the shift register chain (R0 through R2) is equal to zero, then no input sequence detector 432 outputs the no PRBS sequence flag (step 520) and the flag is displayed in step 522. If the output of the shift register chain (R0 through R2) does not equal to zero, the step loops until such condition is detected.

Figure 6:
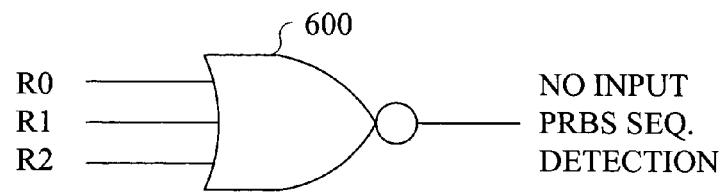
FIG. 6 is a block diagram illustrating a no input sequence detector of a PRBS checker according to an embodiment of the present invention.

Referring now to FIG. 6, a block diagram illustrates a no input sequence detector (e.g., 432 in FIG. 4) of a PRBS checker according to an embodiment of the present invention. It is to be understood that such detector may be implemented in accordance with other arrangements. As shown, FIG. 6 illustrates a three input NOR (negative OR) gate 600 for detecting the non-presence of the PRBS sequence in the PRBS checker. The number of inputs to the NOR gate is three as the PRBS generator ($X^3+X^2+1$) will not generate a sequence with three successive zero bits. However, as mentioned above, the inventive techniques can be extended to any PRBS generator.

Figure 7:
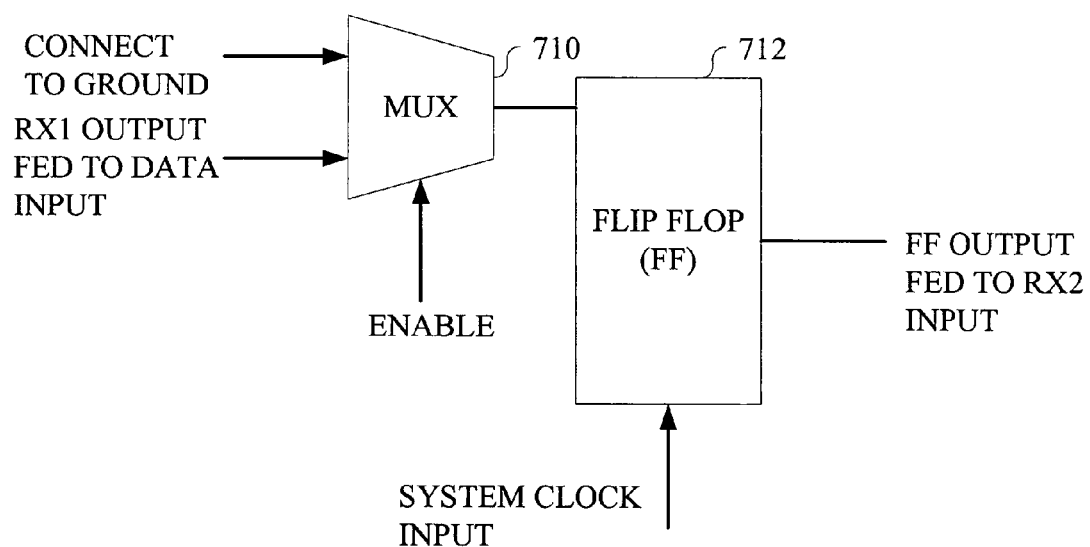
FIG. 7 is a block diagram illustrating a one detector of a PRBS checker according to an embodiment of the present invention.

Referring now to FIG. 7, a block diagram illustrates a one detector (e.g., 436 in FIG. 4) of a PRBS checker according to an embodiment of the present invention. It is to be understood that such detector may be implemented in accordance with other arrangements. FIG. 7 illustrates a one detector including a multiplexor (MUX) 710 with an enable input (from zero detector 434) and a data input (from the output of RX1) and a flip-flop (FF) 712 with a system clock input and an output which is fed to the input of RX2. When the enable is active, the bit at the data input to MUX 710 is transferred to the output of FF 712 on clock transition. If the enable input is inactive, FF 712 keeps sending zeros, so that RX2 does not invert the output of R0.

Figure 8:
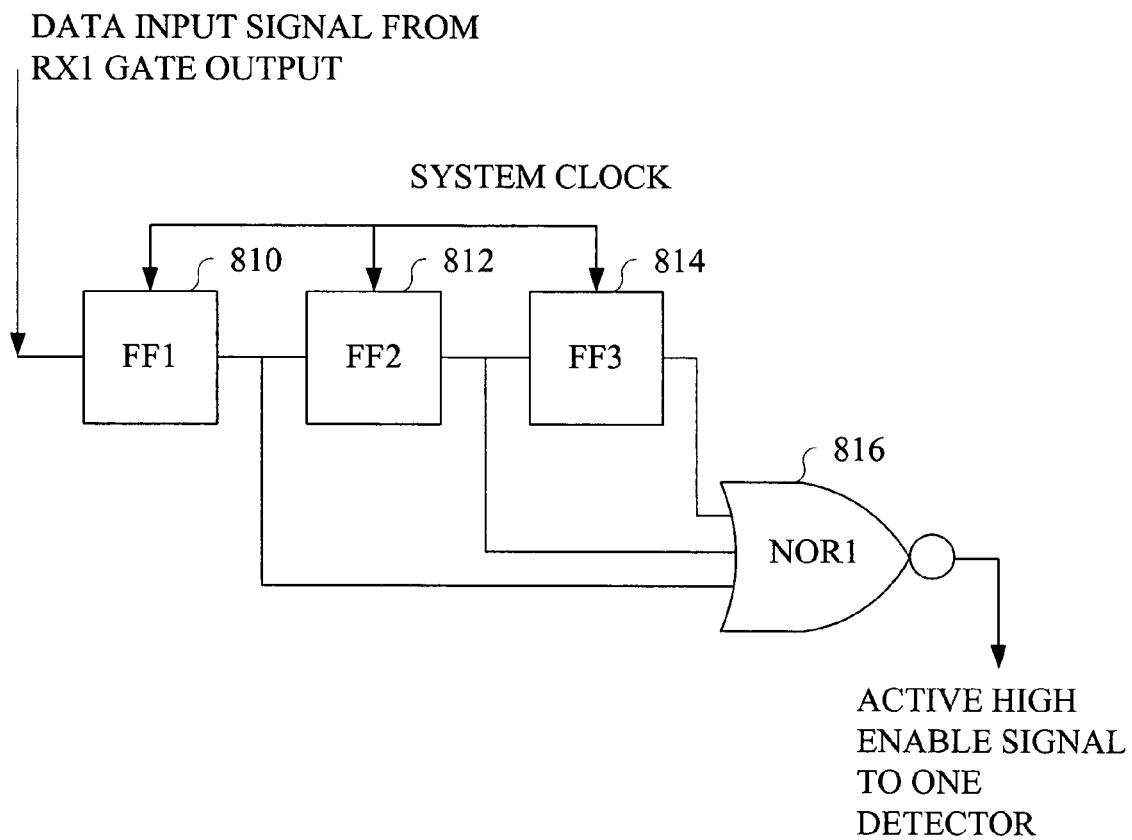
FIG. 8 is a block diagram illustrating a zero detector of a PRBS checker according to an embodiment of the present invention.

Referring now to FIG. 8, a block diagram illustrates a zero detector (e.g., 434 in FIG. 4) of a PRBS checker according to an embodiment of the present invention. It is to be understood that such detector may be implemented in accordance with other arrangements. FIG. 8 illustrates a zero detector including three flip-flops 810, 812 and 814 (FF1 through FF3) connected as a shift register chain, and a three input NOR gate 816 (NOR1). The outputs of FF1 through FF3 are fed to NOR1. In this case, the output of the NOR gate acts as an active high enable signal, on receiving three successive zero bits in the shift register chain. Occurrence of three successive zero bits shows that the checker has not detected any error in the output of DUT for three consecutive clock cycles.

It is to be appreciated that the PRBS checkers (and generators) described above may be implemented in accordance with a processor for controlling and performing the various operations described herein, a memory, and an input/output interface. It is to be appreciated that the term "processor" as used herein is intended to include any processing device, such as, for example, one that includes a CPU (central processing unit) and/or other forms of processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the phrase "input/output interface" as used herein is intended to include, for example, one or more mechanisms for inputting data to the processing unit, and one or more mechanisms for providing results associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

In any case, it should be understood that the components illustrated in the PRBS checker (and generator) embodiments described above may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of checking the accuracy of a pseudorandom bit sequence (PRBS), wherein a first PRBS is generated at a PRBS generator, including a first shift register chain, and presented to a device under test, and the device under test generates a second PRBS in response to the first PRBS, the method comprising the steps of:

delaying the second PRBS in a second shift register chain that corresponds to the first shift register chain to generate a delayed second PRBS;

detecting the presence of an error bit in the second PRBS by comparing the delayed second PRBS at an intermediate point in the second shift register chain with the second PRBS; and prohibiting propagation of the detected error bit such that the detected error bit does not further propagate through the second shift register chain.

2. The method of claim 1, wherein the prohibition step serves to avoid at least one of multiple errors being counted for a single error occurrence and masking errors in the second PRBS.

3. The method of claim 1, wherein the prohibition step further comprises correcting the error bit.

4. The method of claim 1, further comprising the step of detecting the non-presence of a PRBS from the device under test.

5. The method of claim 1, wherein the device under test is one of a communication circuit and a communication channel.

* * * * *